US005535257A

United States Patent [19]

Goldberg et al.

[11] Patent Number: 5,535,257
[45] Date of Patent: Jul. 9, 1996

[54] METHOD AND APPARATUS FOR MANAGING TELEPHONE CALLS IN A SELECTIVE CALL RADIO SYSTEM CONTROLLER

[75] Inventors: Steven J. Goldberg, Coral Springs, Fla.; Hugh Paterson, Ft. Worth, Tex.

[73] Assignee: Motorola, Inc., Schaumburg, Ill.

[21] Appl. No.: 192,535

[22] Filed: Feb. 7, 1994

[51] Int. Cl.⁶ ................................................ H04M 11/00
[52] U.S. Cl. ............................. 379/57; 379/265; 379/266
[58] Field of Search .............................. 379/58, 57, 156, 379/157, 161, 140, 133, 265, 266

[56] References Cited

U.S. PATENT DOCUMENTS 5,027,384  6/1991  Morganstein ..................... 379/212 X
5,214,688  5/1993  Szlam et al. ...................... 379/265 X Primary Examiner—Curtis Kuntz
Assistant Examiner—G. J. Oehling
Attorney, Agent, or Firm—James A. Lamb

[57] ABSTRACT

A system controller (102) for managing telephone inputs includes telephone inputs for connecting to telephone calls, a service request handler (420), a monitor (432), and a limit adjuster (434). The telephone inputs are used for telephone calls, each telephone call being one of a plurality of call types. The service request hander (420) handles requests for phone call service by connecting telephone inputs to telephone calls according to an input limit for the call types, and further couples the telephone inputs to call handlers according to the call types. The monitor (432) monitors call connections of the telephone inputs for a first call type. The limit adjuster (434) adjusts an input limit according to a utilization factor derived in the monitoring step.

16 Claims, 7 Drawing Sheets

METHOD AND APPARATUS FOR MANAGING TELEPHONE CALLS IN A SELECTIVE CALL RADIO SYSTEM CONTROLLER

FIELD OF THE INVENTION

This invention relates in general to managing telephone calls and in particular to managing telephone calls coming into a selective call radio system, wherein more than one type of incoming telephone call is involved.

BACKGROUND OF THE INVENTION

A known means of managing telephone calls coming into a system controller for a selective call radio system, which has been used successfully, has been to use, equally, all telephone inputs within the controller for connection to any incoming telephone call, irrespective of the type of call. In typical existing systems, such as paging subscriber systems, the vast majority of the telephone calls are by an originator for the purpose of initiating a paging message, which may be a voice or data message, and which is typically queued by the system controller for transmitting to a subscriber's selective call receiver. A small portion of the telephone calls are for other purposes, such as modifying a data base of subscriber preferences, which typically resides in the system controller's disk memory. Typical items contained in the subscriber preference data base are, but not limited to, the hours during which the subscriber wishes pages for his selective call device to be held instead of transmitted. Another example of subscriber preferences is for designating, from a large class of news types offered from a news service, a subset of the news types of interest to the subscriber, which are the only types of news to be transmitted to the subscriber. This saves time and money for the subscriber, compared to receiving all the types of news.

Selective call radio systems, such as paging and two way data systems, are becoming more geographically widespread and the subscriber's, who are more mobile, want service over the wider geographic area. Presently at least two paging systems and one data messaging system are providing service across the United States of America, offering coverage in many metropolitan areas. As such systems continue to grow geographically, the need for making telephone calls to the system for the purpose of making a change to the subscriber preference data base is increasing. For example, the hours for holding paging messages change when the time zone of the subscriber's location changes. Also, the location of the selective call device itself can be an important item included in the preferences data base. The location is important because if it is known, an economical transmission to the selective call device can originate from as few as one transmission site. This is in contrast to transmitting from perhaps all of the geographically separated transmission sites of the system, which could be required when the location of the selective call device is not known.

As selective call systems are becoming more geographically widespread, the cost of making telephone calls to the system becomes greater, because the distance of the telephone call is typically longer. The calls to send a message in today's system typically must contend for the lines also used for altering the subscriber preferences, leading to a lack of messaging service when the system is heavily loaded with preference data base calls.

Thus, what is needed is a means to improve the management of the phone calls coming into the system controller to better assure service to all the telephone call types, as appropriate by the priority of the call type.

SUMMARY OF THE INVENTION

Accordingly, in a first aspect of the present invention, a method for use in a radio communication system controller manages connections of telephone calls. The method includes the steps of handling a request for phone call service according to a call type, monitoring telephone call connections of each of a plurality of call types, and adjusting one or more input limits. Each of the telephone calls is one of a plurality of call types.

In the step of handling a request for phone call service, phone call service is handled by establishing a telephone call connection of a call type to one of a plurality of message handlers according to the call type and an input limit for the call type. In the step of adjusting one or more input limits, the input limits are adjusted in response to a utilization factor derived in the monitoring step and a predetermined priority for a particular call type.

The step of monitoring includes the steps of adjusting a count, updating a loading factor, and deriving a utilization factor for the particular call type from the loading factor. In the step of adjusting a count, a count in a input counter is adjusted when a telephone call connection changes, thereby maintaining the count of telephone call connections in use for the particular call type. In the step of updating the loading factor, the loading factor is updated for the particular call type by averaging the count in the input counter over a predetermined past time period.

Accordingly, in a second aspect of the present invention, a system controller for managing connections of telephone calls includes a plurality of message handlers, a service request handling means, a monitor means, and a limit adjustment means. Each telephone call is one of a plurality of call types. Each message handler is for processing a telephone call. The service request handling means, which is coupled to the plurality of message handlers, is for handling a request for phone call service by establishing a telephone call connection of a call type to one of the plurality of message handlers according to the call type and an input limit for the call type. The monitor means, which is coupled to the service request handling means, is for monitoring telephone call connections of each of the plurality of call types.

The monitor means includes means for adjusting a count in an input counter for a first call type, means for updating a loading factor for the first call type, and means for deriving a utilization factor for the first call type from the loading factor for the first call type. The loading factor is updated by averaging the count in the input counter over a predetermined past time period.

BRIEF DESCRIPTION OF THE DRAWING

FIG. I is an electrical block diagram of a ground based radio communication system, in accordance with the first and second embodiments of the present invention.

DETAILED DESCRIPTION OF THE INVENTION

Figure 1:
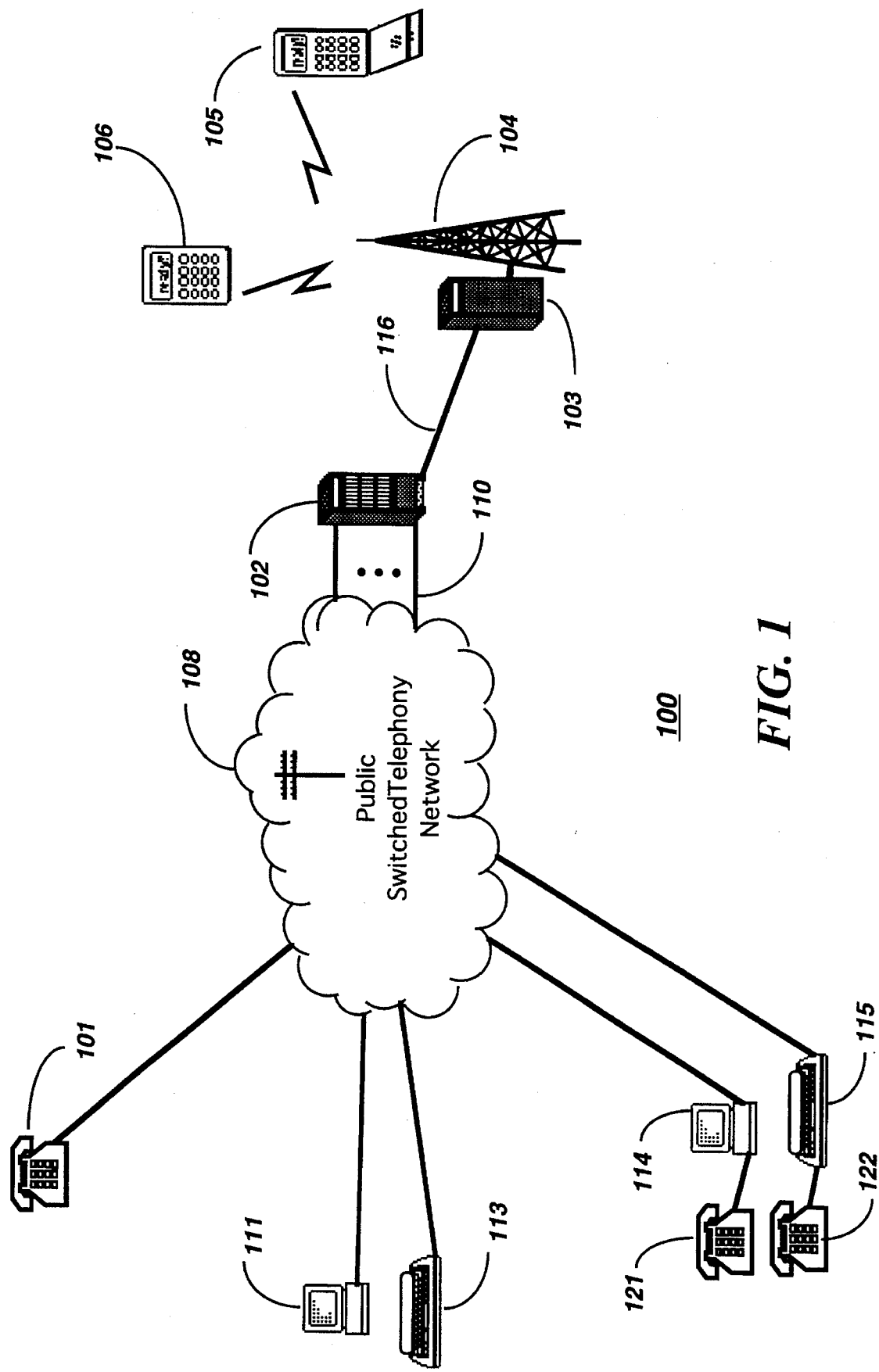

Referring to FIG. 1, an electrical block diagram of a ground based selective call radio communication system 100 is shown in accordance with the first and second embodiments of the present invention. The radio communication system 100 comprises message input devices, such as a telephone 101, a computer 111, a desktop messaging unit 113 (such as a desktop paging device), a telephone/computer combination 121 and 114, or a telephone/desktop messaging unit combination 122 and 115, coupled by a conventional public switched telephone network (PSTN) 108 to a system controller 102 through a plurality of telephone links 110. The phone links 110 may be a plurality of twisted wire pairs, or a multiplexed trunk line. The system controller 102 is coupled to and oversees the operation of a radio frequency transmitter/receivers 103, through a communication link 116, which typically is a twisted pair telephone wire, and additionally can include RF, microwave, or other high quality audio links. The transmitter/receiver 103 encodes and decodes inbound and outbound telephone addresses into formats that are compatible with land line message switch computers and personal radio telephone addressing requirements, such as cellular message protocols. The system controller 102 can also function to encode paging messages for transmission by the radio frequency transmitter/receiver 103 Telephony signals are typically transmitted to and from the system controller 102 by telephone sets such as the telephone 101, the telephone 121 or the telephone 122. However, the computer 114 can interrupt the transmission path between the telephone 121 and the computer 114 when messages are being transmitted between the computer 114 and the PSTN. Similarly, the desktop messaging device 115 can interrupt the transmission path between the telephone 122 and the desktop messaging unit 115 when messages are being transmitted between the desktop messaging unit 115 and the PSTN. Telephony signals and data messages are transmitted from and received by at least one antenna 104 coupled to the radio frequency transmitter/receiver 103. The telephony signals are transmitted to and received from a personal radio telephone 105. The radio frequency transmitter/receiver 103 may also be used to transmit and receive data or voice paging messages to an optional portable receiving device 106.

In the following description, the term portable device 105 or 106 will be used to refer to the personal radio telephone 105 or portable receiving device 106 as described above.

Each of the portable devices 105 or 106 assigned for use in the selective call radio communication system 100 have an address assigned thereto which is unique within the radio communication system 100, for enabling the transmission of a message from the controller 102 only to the selected portable device 105 or 106, and for identifying messages received at the controller 102 from the portable device 105 or 106. A list of assigned addresses for the radio communication system is maintained in the controller 102 in the form a subscriber data base.

Figure 2:
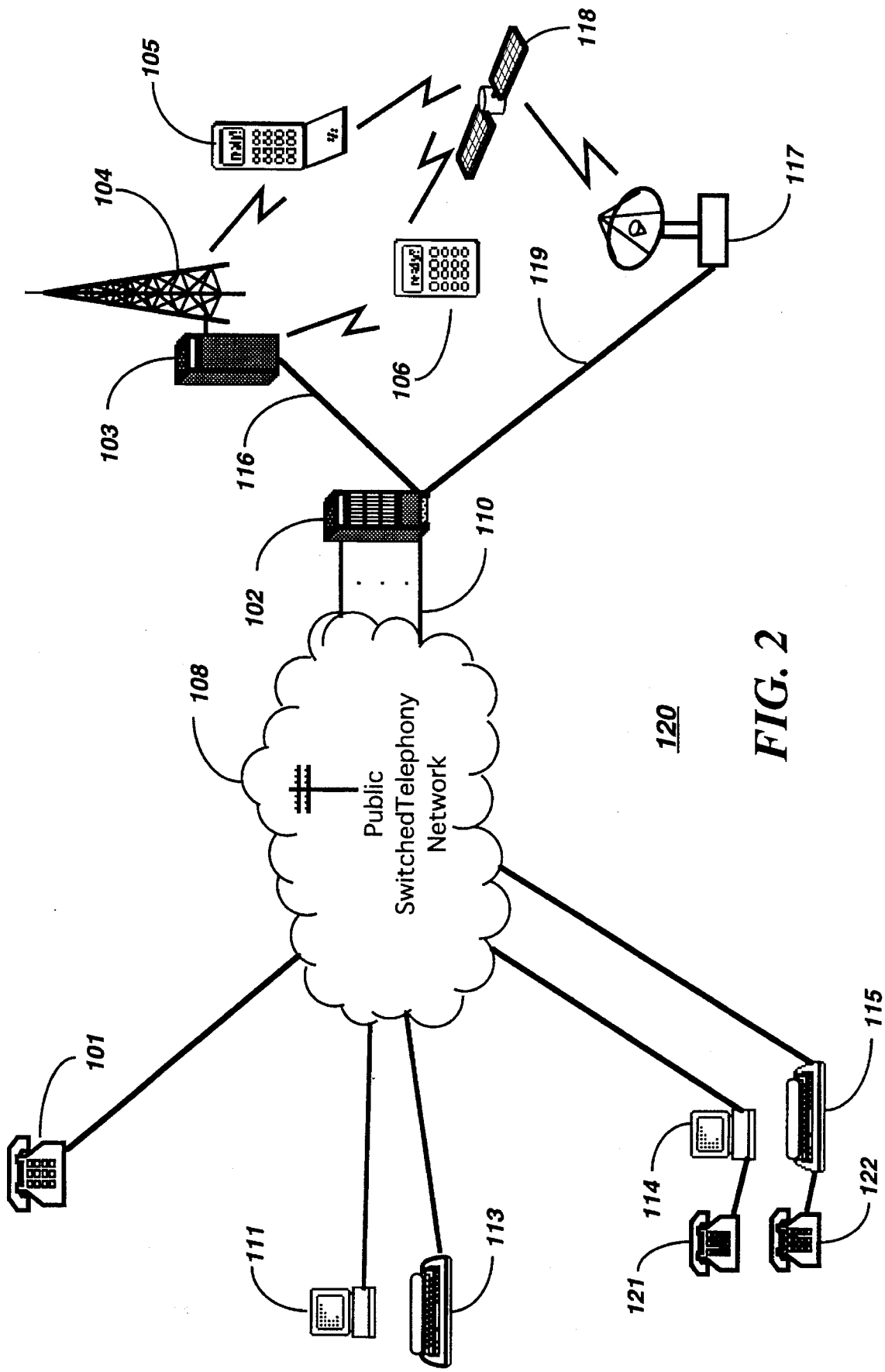
FIG. 2 is an electrical block diagram of an earth orbit satellite radio communication system, in accordance with the first and second embodiments of the present invention.

Referring to FIG. 2, an electrical block diagram of an earth orbit satellite radio communication system 120 is shown in accordance with the first and second embodiments of the present invention. The satellite radio communication system 120 is substantially the same as the radio communication system 100 shown in FIG. 1, with the addition of at least one satellite ground station 117 and at least one earth orbit communication satellite 116. The system controller 102 is coupled to and oversees the operation of the satellite ground station 117 through a communication link 119, which typically is a twisted pair telephone wire, and additionally can include RF, microwave, or other high quality audio links. The system controller 102 is further coupled to and oversees the operation of the radio frequency transmitter/receiver 103 through link 116. Telephony signals and data messages are transmitted from and received by at least one antenna 104 coupled to the radio frequency transmitter/receiver 103, and by the earth orbit communication satellite 116. The portable devices 105 or 106 receive messages from and transmit messages to the system controller 102, by means of the satellite ground station 117 and radio frequency transmitter/receiver 103.

It should be noted that the system controller 102 is capable of operating in a distributed transmission control environment that allows mixing cellular, simulcast, master/slave, or other coverage schemes involving a plurality of radio frequency transmitter/receivers 103, antennas 104, satellite ground stations 117, and earth orbit communication satellites 116 for providing reliable radio signals within a geographic area as large as the entire world. Moreover, as one of ordinary skill in the art would recognize, the telephonic and paging functions may reside in separate system controllers 102 which operate either independently or in a networked fashion.

Figure 3:
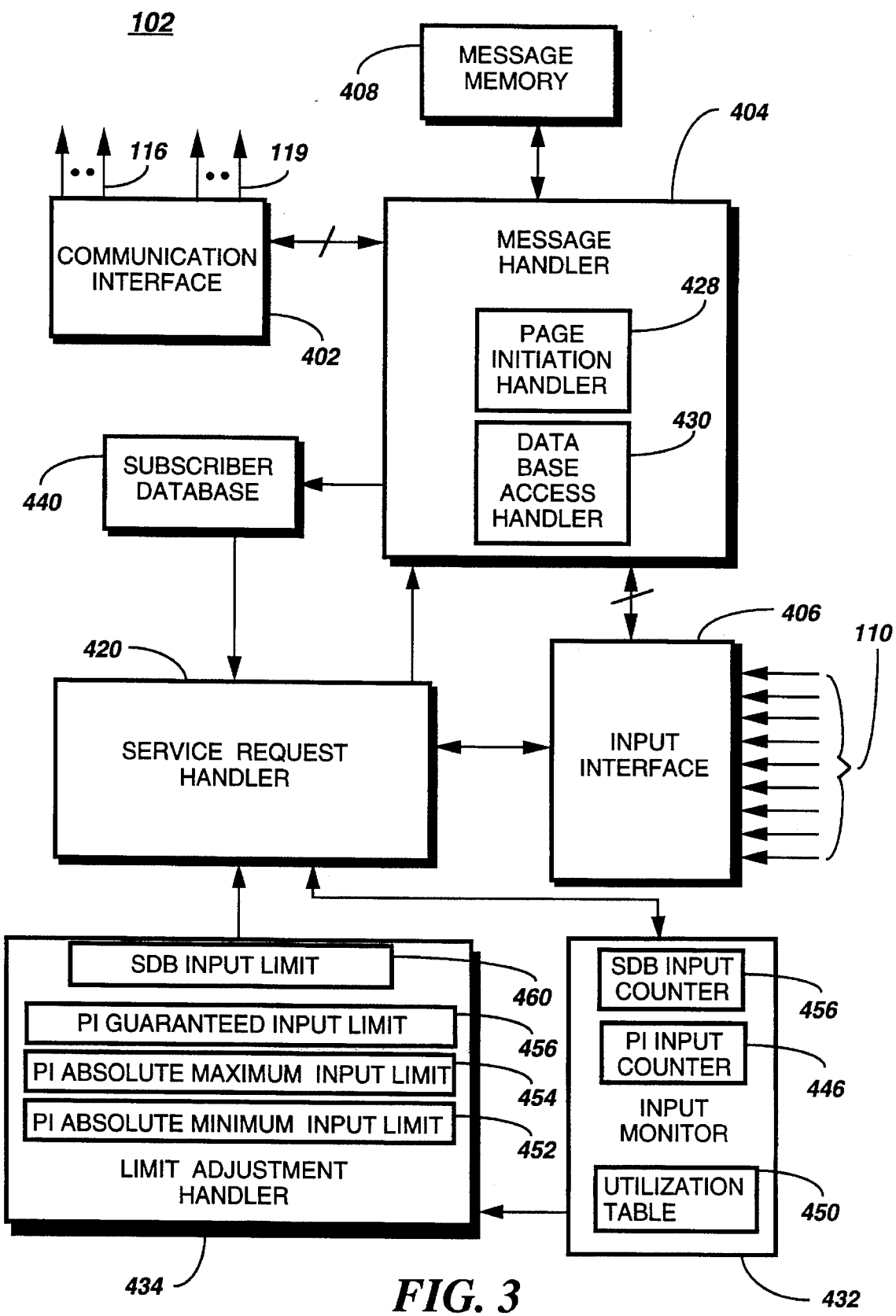
FIG. 3 is an electrical block diagram of a system controller suitable for use in the radio communication systems of FIG. 1 and FIG. 2, in accordance with the first and second embodiments of the present invention.

Referring to FIG. 3, an electrical block diagram of the system controller 102 is shown, in accordance with the first and second embodiments of the present invention. The system controller 102 comprises a communication interface 402, a message handler 404, a message memory 408, a subscriber data base 440, an input interface 406, a service request handler 420, a limit adjustment handler 434, and an input monitor 432. The communication interface 402, which queues data and voice messages for transmission to the portable devices 105 and 106, and receives acknowledgments and messages from the portable devices 105 and 106, is coupled to the radio frequency transmitter/receivers 103 (FIG. 1 and FIG. 2) by the links 116 and is coupled to the ground stations 117 (FIG. 1 and FIG. 2) by the links 119. The message handler 404, which routes and processes messages, is coupled to the communication interface 402 and is further coupled to the input interface 406, to the subscriber data base 440, to the message memory 408, and to the service request handler 420. The input interface 406 handles the PSTN 108 (FIG. 1 and FIG. 2) physical connection, connecting and disconnecting telephone calls at the telephone links 110, and routing the audio signals between the phone links and the message handler 404. The subscriber data base 440 stores information for each subscriber, including subscriber determined preferences. The message memory 408 stores messages which are being held for later scheduled delivery. The input interface 406 is further coupled to the service request handler 420. The service request handler 420 controls the input interface 406 to answer the telephone calls and to couple the telephone calls to the message handler 404. The service request handler 420 is further coupled to the message handler 404, for controlling the assignment of phone calls within the message handler. The service request handler 420 is further coupled to the input monitor 432 and the limit adjustment handler 434. The input monitor 432 monitors a count of the phone link connections made by the input interface 406 and is further coupled to the limit adjustment handler 434, which adjusts limits used by the service request handler 420 to service phone calls.

In accordance with the first and second embodiments of the present invention, the service request handler 420 determines a call type for each telephone which is answered, and further determines whether one of a plurality of input limits has been reached by comparing a present count of inputs used for the call type to a limit for the call type. The count of inputs used for each call type is maintained by the input monitor 432. In an example used herein to describe the embodiments of the present invention, there are two such counters, a page initiation (PI) input counter 446 and a subscriber data base (SDB) input counter 456. The input limits are maintained by the limit adjustment handler 434. In this example, the input limits maintained by the limit adjustment handler 434 include a subscriber data base (SDB) input limit 460 and three page initiation (PI) input limits: a PI guaranteed input limit 456, a PI absolute maximum input limit 454, and a PI absolute minimum limit 452.

The system controller 102 is preferably a model E09PED0552 PageBridge® paging terminal manufactured by Motorola, Inc., of Schaumburg Ill., modified with special firmware elements in accordance with the first and second embodiments of the present invention, as will be described below. The communication interface 402, the message handler 404, the message memory 408, the subscriber data base 440, the input interface 406, the service request handler 420, the limit adjustment handler 434, and the input monitor 432 are preferably implemented within portions of the model E09PED0552 PageBridge® paging terminal which include, but are not limited to those portions providing program memory, a central processing unit, input/output peripherals, and a random access memory. The system controller alternatively could be a MPS2000® paging terminal. The subscriber data base 440 and message memory 408 may alternatively be implemented as magnetic or optical disk memory, which may alternatively be external to the system controller 102.

In the example used herein to describe the first and second embodiments of the present invention, the telephone calls coming into the system controller 102 are of two types: paging initiation calls and subscriber data base calls. Paging initiation calls include a subscriber address and a data or voice message, can typically be completed in a non-interactive manner with the originator, and are stored in the message memory 408 until being transmitted to the portable device 105 or 106. Subscriber data base calls also include an subscriber address, but are typically interactive in nature, and include data which is used to modify the subscriber data base 440. It should be appreciated that additional types of phone calls could be managed by the present invention as well.

In accordance with the first embodiments of the present invention, which is suitable for use with a digital PSTN interface, the telephone links 110 are of the type used in a typical trunked telephone connection from a local area telephone office having a digital trunk connection, wherein the subscriber address is conveyed by the PSTN 108 to the controller 102 in a connection request message, in the form of one of a plurality of telephone numbers assigned, within the PSTN 108, uniquely to the communication system 100. Two telephone numbers are uniquely assigned, within the subscriber data base 440, to an address of a portable device 105 or 106; one telephone number is used to indicate a paging initiation message and the other is used to indicate a subscriber data base message. It will be appreciated that if there were additional call types, they would be indicated by additional phone numbers for each subscriber.

Figure 4:
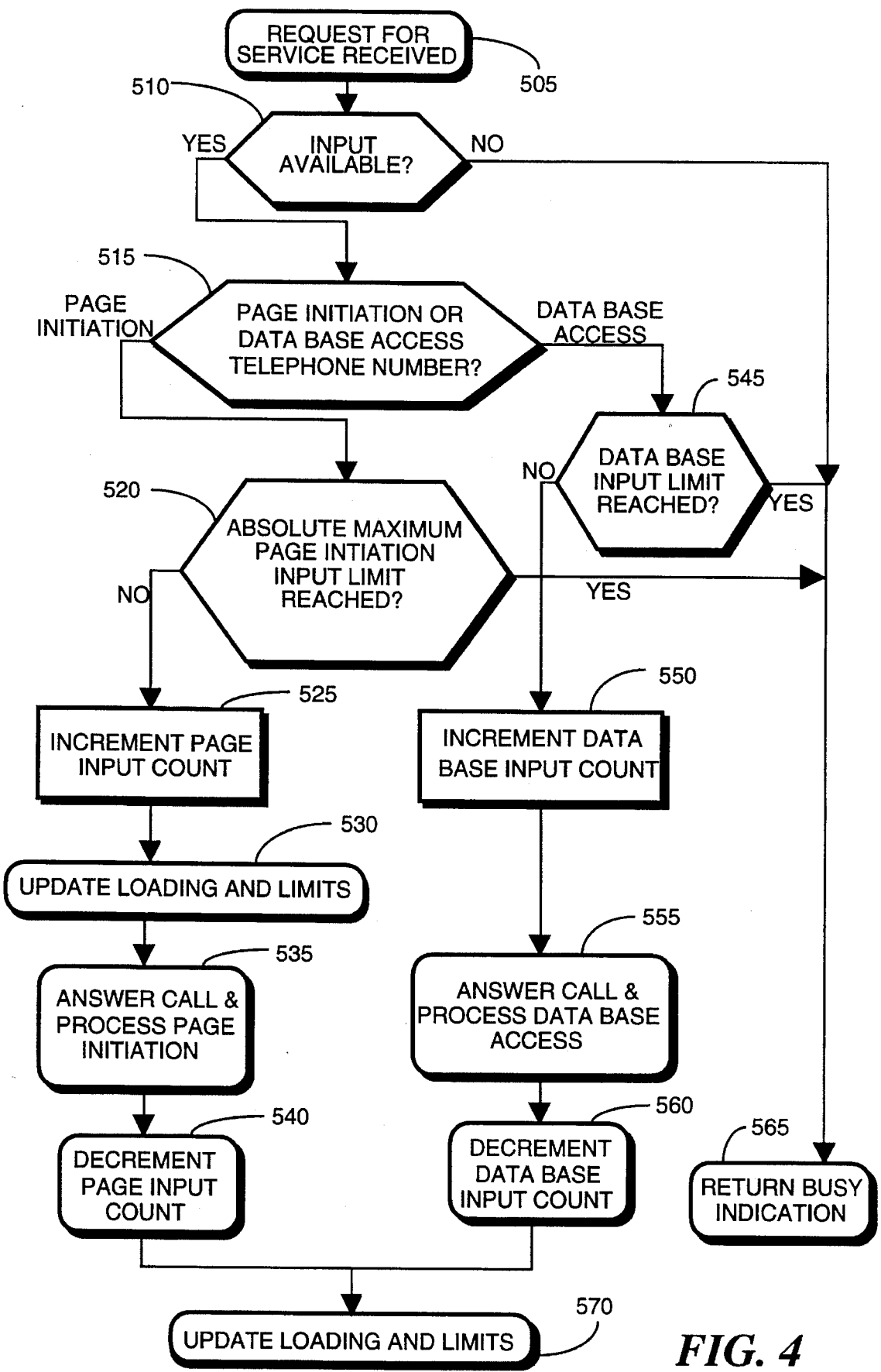
FIG. 4 shows a flow chart which illustrates a method of managing the telephone inputs of the system controller of FIG. 3, in accordance with a first embodiment of the present invention.

Referring to FIG. 4, a flow chart which illustrates a method of managing the telephone inputs of the system controller of FIG. 3 is shown, in accordance with a first embodiment of the present invention. When a telephone call connection request message is received at step 505, the service request handler 420 (FIG. 3) determines whether there is input, computing and storage capacity available within the controller 102 (FIG. 3) to handle an additional telephone call. When such capacity exists at step 510, the service request handler 420 determines the type of call being made at step 515 by the phone number which is received from the PSTN. The service request handler passes the telephone number to the message handler 404 for determination of the subscriber address by reference to the subscriber data base 440. When input, computing and storage capacity is not available within the controller 102 (FIG. 3) to handle an additional telephone call, the connection request is denied at step 565 and a busy indication is returned. In the first embodiment of the present invention, this happens very quickly. The originator experiences a dial tone followed by a busy signal.

When the call type is a subscriber data base call and the subscriber data base input limit 460 (FIG. 3) has been reached at step 545, or when the call type is a paging initiation call and the absolute maximum paging initiation limit 454 (FIG. 3) has been reached at step 520, the connection request is denied and a busy indication is returned at step 565. In the first embodiment of the present invention, this happens very quickly. The originator experiences a dial tone followed by a busy signal. When the call type is a subscriber data base call and the subscriber data base input limit 460 (FIG. 3) has not been reached at step 545, the input monitor 432 (FIG. 3) increments a subscriber data base counter 456 (FIG. 3) at step 550. The service request handler 420 (FIG. 3) controls the input interface 406 (FIG. 3) to connect to one of the telephone links 110 (FIG. 3), and to couple the telephone call from the one of the telephone links 110 (FIG. 3) to the message handler 404 (FIG. 3), and passes control of the telephone call to the message handler 404 (FIG. 3), for handling by a data base access handler 430 (FIG. 3) at step 555. The data base access handler 430 (FIG. 3) processes the telephone call by interacting with the originator to affect a modification to the subscriber data base 440 (FIG. 3). When the process is completed, the data base access handler 430 (FIG. 3) disconnects the input interface 406 (FIG. 3) from the telephone call. The input monitor 432 (FIG. 3) decrements the subscriber data base counter 456 (FIG. 3) at step 560, which completes the call handling at step 570.

Referring further to FIG. 4, when the call type is a paging initiation call and the absolute maximum paging initiation limit 454 (FIG. 3) has not been reached at step 520, the input monitor 432 (FIG. 3) increments a page initiation input counter 446 (FIG. 3) at step 525 and initiates an update to an input loading factor and the input limits at step 530, which will be described below. When input load and limit update is complete at step 530, the service request handler 420 (FIG. 3) controls the input interface 406 (FIG. 3) to connect to one of the telephone links 110 (FIG. 3), and to couple the telephone call from the one of the telephone links 110 (FIG. 3) to the message handler 404 (FIG. 3), and passes control of the telephone call to the message handler 404 (FIG. 3), for handling by the page initiation handler 428 (FIG. 3) at step 535. The page initiation handler 428 (FIG. 3) processes the paging message by queuing the paging message for transmission to the portable device 105 or 106 (FIG. 3), or by storing the paging message in the message memory 408 (FIG. 3) for transmission at a later time. The page initiation handler 428 (FIG. 3) disconnects the telephone call and the input interface 406 (FIG. 3) when the telephone call is complete. The input monitor 432 (FIG. 3) decrements the page initiation input counter 446 (FIG. 3) at step 540, which completes the call handling at step 570.

In accordance with the first embodiment of the present invention suitable for use with a PSTN employing local loop connection, the links 110 are the type used in a typical non-trunked telephone connection from a local area telephone office having local loop connections, wherein the subscriber address is conveyed by the originator to the controller 102, after the phone call from the originator is answered by the controller 102. Equivalently, the links may be of the type described above with reference to the first embodiment of the present invention, but two telephone numbers are not assigned to each portable device 105 or 106, resulting in the same situation that the phone call from the originator must be answered to ascertain the call type, and perhaps the subscriber address as well.

Figure 5:
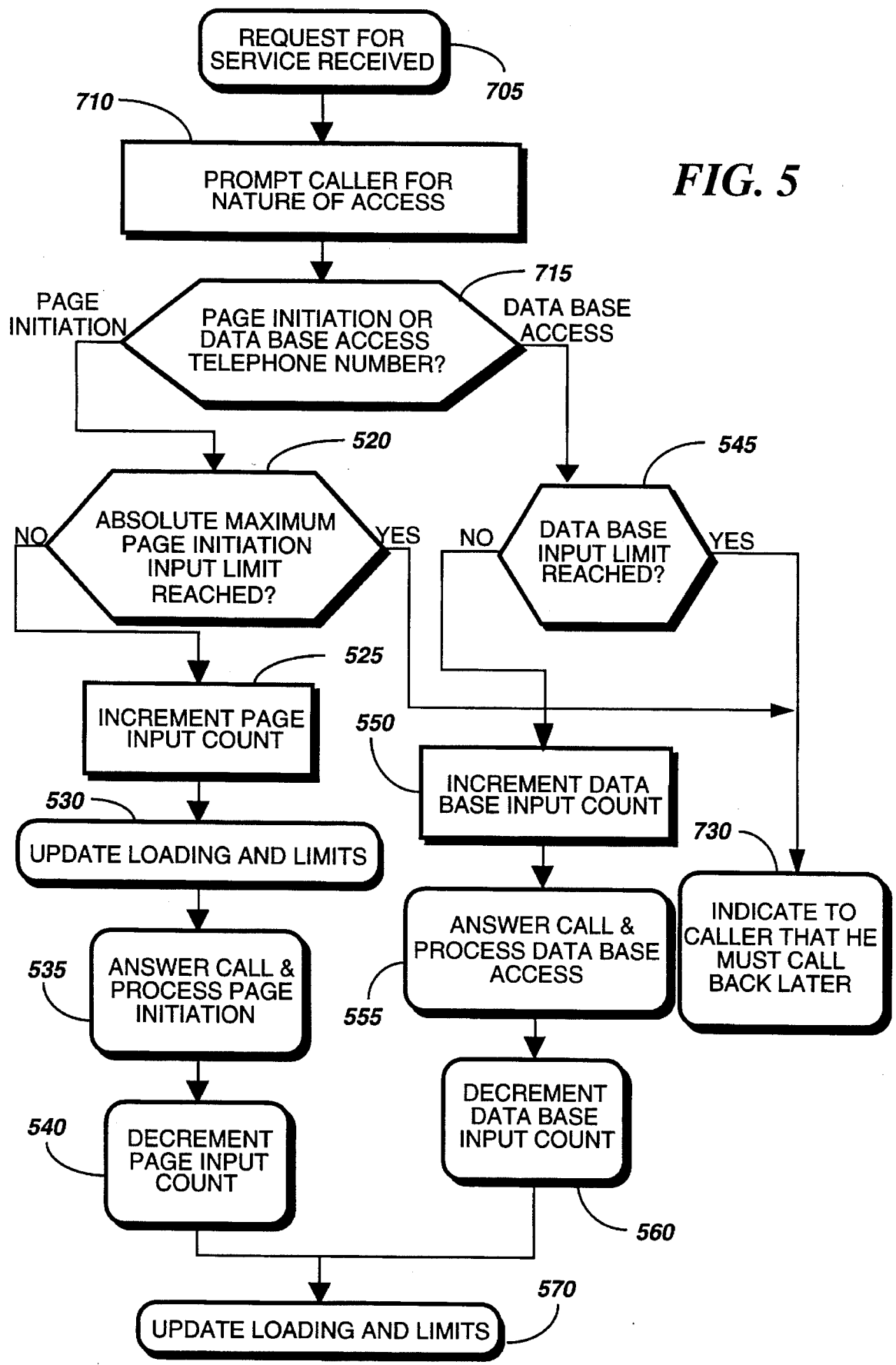
FIG. 5 shows a flow chart which illustrates a method of managing the telephone inputs of the system controller of FIG. 3, in accordance with a second embodiment of the present invention.

Referring to FIG. 5, a flow chart which illustrates a method of managing the telephone inputs of the system controller shown in FIG. 3, in accordance with a second embodiment of the present invention. When a telephone call is received at the input interface at step 705, the service request handler 420 (FIG. 3), in a manner well known to one of ordinary skill in the art, prompts the originator for a response, such as a sequence of characters starting with a special symbol, such as the asterisk, and waits for a predetermined time period, at step 710. When an appropriate sequence is received by the service request handler 420 (FIG. 3), the call is handled as the subscriber data base type of call at step 715. When an appropriate sequence is not received by the service request handler 420 (FIG. 3), the call is handled as the paging initiation type of call at step 715. It will be appreciated that if there were additional call types, they would be indicated by the symbols received after the special symbol.

When the call type is a subscriber data base call, the process flow continues at step 545 and proceeds exactly as described above with respect to steps 545, 550, 555, 560, and 570 in FIG. 4. When the call type is a page initiation call, the process flow continues at step 520 and proceeds exactly as described above with respect to steps 525, 530, 535, 540, and 570 in FIG. 4.

Figure 6:
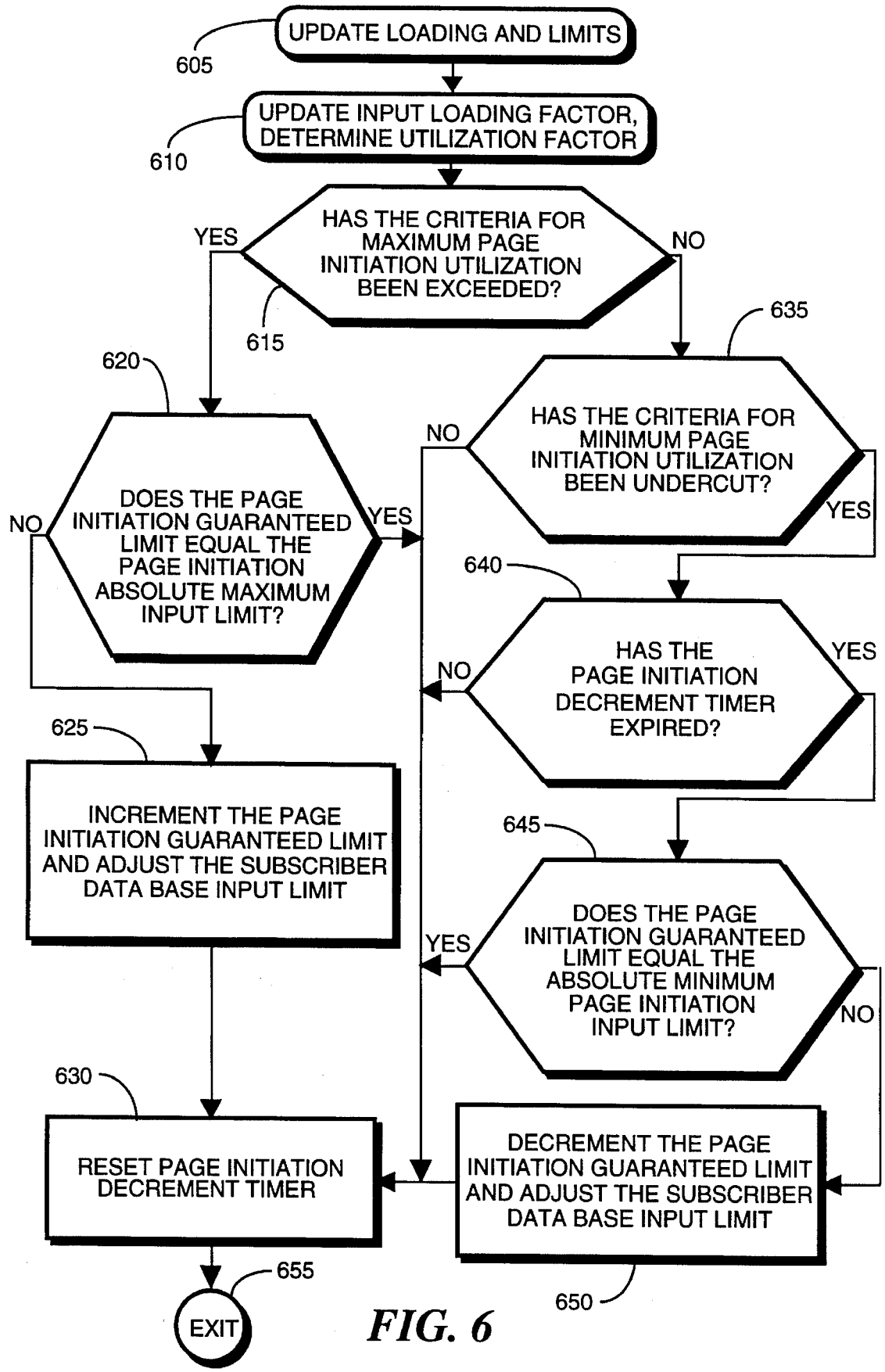
FIG. 6 shows a flow chart which illustrates a method of adjusting input limits used in the methods of FIG. 4 and FIG. 5, in accordance with a first and second embodiments of the present invention.

Referring to FIG. 6, a flow chart which illustrates a method of adjusting input limits used in the methods of FIG. 4 and FIG. 5 is shown, in accordance with the first and second embodiments of the present invention. When an update to an input loading factor and the input limits is initiated at step 605, the input loading factor is updated and an updated utilization factor is derived, at step 610. When the updated utilization factor is less than a maximum utilization factor at step 615, and less than a minimum utilization factor at step 635, and when a page initiation decrement timer has expired at step 640, and the page initiation guaranteed limit 456 (FIG. 3) is greater than or equal to the page initiation absolute minimum, the limit adjustment handler 434 (FIG. 3) decrements the paging initiation guaranteed limit 456 (FIG. 3) by one and the subscriber data base input limit is adjusted at step 650. The page initiation decrement timer, which has a predetermined expiration time, is reset at step 630, and the update to the input loading factor 448 (FIG. 7) and input limits is completed at step 655, which will be described below.

When the updated utilization factor is less than a maximum utilization factor at step 615, and greater than a minimum utilization factor at step 635, the page initiation decrement timer is reset at step 630, and the update to the input loading factor and input limits is completed at step 635. When the updated utilization factor is less than a maximum utilization factor at step 615, and greater than a minimum utilization factor at step 635, and when a page initiation decrement timer has not expired at step 640, the page initiation decrement timer is reset at step 630, and the update to the input loading factor and input limits is completed at step 635. When the updated utilization factor is less than a maximum utilization factor at step 615, and greater than a minimum utilization factor at step 635, and when a page initiation decrement timer has not expired at step 640, and the page initiation guaranteed limit 456 (FIG. 3) is less than the page initiation absolute minimum, the page initiation decrement timer is reset at step 630, and the update to the input loading factor 448 (FIG. 7) and input limits is completed at step 655, which will be described below.

When the updated utilization factor is less than a maximum utilization factor at step 615, and the page initiation guaranteed input limit is less than the page initiation absolute maximum input limit at step 620, the page initiation guaranteed input limit is incremented and the subscriber data base input limit is adjusted at step 625. The page initiation decrement timer is reset at step 630, and the update to the input loading factor 448 (FIG. 7) and input limits is completed at step 655, which will be described below.

When the updated utilization factor is less than a maximum utilization factor at step 615, and the page initiation guaranteed input limit is equal to the page initiation absolute maximum input limit at step 620, the page initiation decrement timer is reset at step 630, and the update to the input loading factor 448 (FIG. 7) and input limits is completed at step 655.

Figure 7:
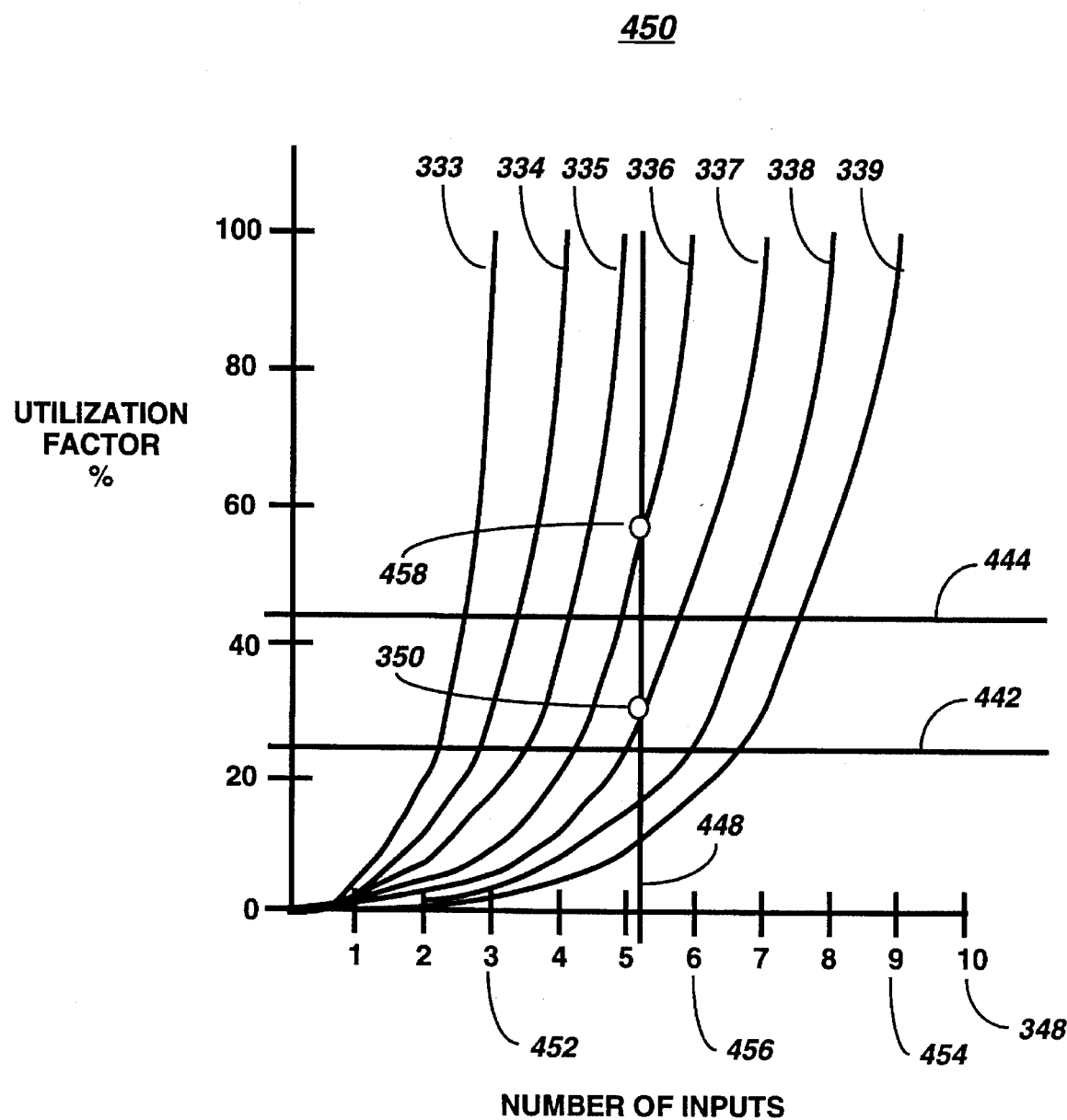
FIG. 7 is a graph of a utilization table stored in, and used by, the system controller of FIG. 3, in accordance with the first and second embodiments of the present invention.

Referring to FIG. 7, a graph of a utilization table 450 used by the input monitor 432 (FIG. 3) of the system controller 102 is shown, in accordance with the first and second embodiments of the present invention. The graph is used herein to describe the input loading and utilization factor update, which is step 610 of the method illustrated in FIG. 6. The graph shows a predetermined family of utilization curves 333 to 339, each of which is associated with an input limit. Each utilization curve 333 to 339 in the utilization table 450 is a curve for a specific paging initiation guaranteed limit, relating a probability of not being able to handle a new connection within a period of time to the input loading factor, which is measured as an average number of inputs in use. The utilization curves 333 to 339 are stored in the random access memory of the controller 102. Also shown on the graph are a predetermined minimum page initiation utilization factor 442 and a predetermined maximum page initiation utilization factor 444. In this example, the family of utilization curves 333 to 339 is associated with paging initiation guaranteed limits of 3, 4, 5, 6, 7, 8, and 9. The update to the utilization factor 358 is started by updating the loading factor 448, which update is derived by averaging the number of inputs counted by the page initiation input counter 446 over a predetermined past time period, for example, the last ten minutes. The loading factor 448 for this example is 5.2, the absolute minimum page initiation input limit 452 is 3, the absolute maximum page initiation input limit 454 is 9, and the page initiation guaranteed input limit 456 has a value of 6. Further, in this example, the minimum page initiation utilization factor 442 is 25% and the maximum page initiation utilization factor 444 is 44%. From the loading factor 448 of 5.2 and the page initiation guaranteed input limit 456 of 6, the utilization factor 458 is determined from curve 336 of the utilization table 450. The utilization table 450 comprises values for points on the utilization curves 333 to 339 for significant combinations of the loading factor 448 and the input limit 456. In this example, the utilization factor is approximately 57%. The updated utilization factor 458 of 57% exceeds the maximum utilization factor 444 of 44% (step 615 of FIG. 6), and the page initiation guaranteed limit 456 of 6 is less than the page initiation absolute maximum input limit 454 of 9 (step 620 of FIG. 6), so the paging initiation guaranteed limit 456 is incremented from 6 to 7 (step 625 of FIG. 6). It will be appreciated that, in this example, if the loading remains at 5.2, the new utilization factor 350 will be approximately 34%, which is within the minimum and maximum utilization factors 442 and 444, and adjustments will not be made on subsequent updates to the input loading and utilization factor.

It will be appreciated that the utilization table 450 can alternatively be stored in the form of a plurality of sets of coefficients of a polynomial equation, wherein each set of coefficients is associated with one of the paging initiation guaranteed limits (being 3, 4, 5, 6, 7, 8, and 9 in the example). For example, in a manner known to one of ordinary skill in the art, four coefficients can be predetermined for use in a fourth order polynomial which closely represents the curve 336 of FIG. 7 with the loading factor being an independent variable. In this alternative configuration for the utilization table 45, the utilization table 450 comprises seven sets of four coefficients to represent the seven curves 333 to 339. The utilization table 450 can be used with the loading factor 448 and the paging initiation guaranteed limit 456 to determine the utilization factor 350, having substantially the same value as determined by the table 450 described above with reference to FIG. 7, which is a table of data points.

Referring back to FIG. 6, at step 625, the limit adjustment handler 434 (FIG. 3) adjusts the subscriber data base input limit 460 (FIG. 3) in conjunction with changes to the paging initiation guaranteed limit 456 (FIG. 7). In the present example the subscriber data base input limit 460 (FIG. 3) is adjusted to maintain the subscriber data base input Limit 460 (FIG. 3) equal to a capacity 348 of the input interface 406 (FIG. 3) minus the paging initiation guaranteed limit 456 (FIG. 3). In this example, the capacity 348 of the input interface is 10 and the updated paging initiation guaranteed limit 456 is changed from 6 to 7, so the updated subscriber data base input limit 460 (FIG. 3) is adjusted from 4 to 3.

Thus, the monitoring and updating of the page initiation guaranteed limit 456 and subscriber data base input limit 460 in the manner described above serves to adjust the subscriber data base input limit 460 in response to the recent level of loading of the high priority page initiation telephone inputs, which results in a management of all the telephone inputs so as to maintain a high level of service for the paging initiation calls, while providing optimized service for the lower priority subscriber data base calls.

It should be appreciated that more than two call types can be managed by the present invention, by simply adding more input counters for additional call types having the lower kind of priority described above for the subscriber data base calls, and providing additional input limits corresponding to the additional lower priority call types. The limits for the multiple lower priority types would simply be adjusted to maintain a relationship of the number of inputs available for each of the call types, within an integral tolerance of plus or minus one. This would provide management of one high priority call type and several lower priority call types.

It should be further appreciated that more than two call types of the higher priority could also be managed by adding input counters, guaranteed input limits, and absolute maximum and minimum input limits, corresponding to the additional higher priority call types. The limits for the multiple higher priority types would simply be adjusted to maintain a relationship of the number of inputs available for each of the higher priority call types, within an integral tolerance of plus or minus one, and the sum of the guaranteed input limits for the higher priority calls would be subtracted from the capacity of the input interface, in order to determine the number of lines available for lower priority call types.

By now it should be appreciated that there has been provided a methods and apparatus which manage the telephone inputs so as to provide a high level of service to call types of a higher priority, based on recent loading history, while providing optimized service for call types of lower priority, thereby improving customer service in a selective call radio communication system.

We claim:

1. A method for use in a radio communication system controller which manages connections of telephone calls, each of the telephone calls being one of a plurality of call types, said method comprising the steps of:

handling a request for phone call service by establishing a telephone call connection of a call type to one of a plurality of message handlers according to the call type and an input limit for the call type;

monitoring telephone call connections of each of the plurality of call types, wherein said step of monitoring comprises the steps of:

adjusting a count in an input counter when a telephone call connection changes, thereby maintaining the count of telephone call connections in use for a particular call type;

updating a loading factor for the particular call type by averaging the count in the input counter over a predetermined past time period; and deriving a utilization factor for the particular call type from the loading factor; and adjusting one or more input limits in response to the utilization factor derived in said monitoring step and a predetermined priority for the particular call type.

2. The method according to claim 1, wherein said step of deriving the utilization factor further comprises the step of:

deriving the utilization factor from a utilization table, using the loading factor and the input limit for the call type.

3. The method according to claim 1, wherein said step of deriving the utilization factor further comprises the step of:

deriving the utilization factor from a polynomial formula, the loading factor, and the input limit for the call type.

4. The method according to claim 1, wherein said step of adjusting one or more input limits is performed when the input counter is adjusted.

5. The method according to claim 1, wherein said step of adjusting one or more input limits is performed only when the predetermined priority of the particular call type is a highest predetermined priority.

6. The method according to claim 1, wherein said step of adjusting one or more input limits further comprises the steps of:

incrementing the input limit for the call type when the utilization factor for the call type exceeds a predetermined maximum utilization value and the input limit does not exceed a predetermined absolute maximum input limit.

7. The method according to claim 1, wherein the step of adjusting one or more input limits further comprises the steps of:

decrementing the input limit for the call type when the utilization factor for the call type is less than a predetermined minimum utilization value and the input limit is not less than a predetermined absolute minimum input limit.

8. The method according to claim 1, wherein said step of adjusting one or more input limits further comprises the steps of:

resetting a limit decrement timer when the input limit is adjusted; and decrementing the input limit for the call type when the limit decrement timer has exceeded a predetermined time, and the utilization factor for the call type is less than a predetermined minimum utilization factor, and the input limit is not less than a predetermined absolute minimum input limit.

9. A system controller for managing connections of telephone calls, each of the telephone calls being one of a plurality of call types, comprising:

a plurality of message handlers, each for processing a telephone call;

service request handling means, coupled to said plurality of message handlers, for handling a request for phone call service by establishing a telephone call connection of a call type to one of the plurality of message handlers according to the call type and an input limit for the call type;

monitor means, coupled to said service request handling means, for monitoring telephone call connections of each of the plurality of call types, said monitor means including means for adjusting a count in an input counter for a first call type, means for updating a loading factor for the first call type by averaging the count in the input counter over a predetermined past time period, and means for deriving a utilization factor for the first call type from the loading factor for the first call type; and limit adjustment means, for adjusting one or more input limits in response to the utilization factor derived by said monitor means and a predetermined priority for the first call type.

10. The system controller according to claim 9, wherein said limit adjustment means further adjusts an input limit according to predetermined maximum and minimum utilization factors, predetermined absolute maximum and minimum input limits, and the predetermined priority for a first call type.

11. The system controller according to claim 9, wherein the service request handling means further comprises:

radio encoder/transmitter controller means for controlling radio transmission of a message to one or more selective call receiving devices, and wherein one of said plurality of message handlers is a page message initiation handling means, coupled to said radio encoder/transmitter controller means, for initiating a radio message transmission to the one or more selective call receiving devices when a first call type is a paging call.

12. The system controller according to claim 9, wherein said service request handling means further comprises:

a selective call data base, coupled to said plurality of message handlers for storing user preferences for each ..of one or more selective call receiving devices_; and wherein one of said plurality of message handlers is a data base access handling means, coupled to said selective call data base for modifying said selective call data base when a first call type is a data base access.

13. The system controller according to claim 9, wherein said monitor means derives the utilization factor from a utilization table stored in said monitor means.

14. The system controller according to claim 9, wherein said means for deriving a utilization factor derives the utilization factor from a polynomial formula, the loading factor for the first call type, and the input limit for the first call type.

15. The system controller according to claim 9, wherein said limit adjustment means adjusts the input limit when the input counter is adjusted.

16. The system controller according to claim 9, wherein said limit adjustment means adjusts the one or more input limits only when the predetermined priority of the first call type is highest predetermined priority.

* * * * *